United States Patent
Pliha

[15] 3,651,691
[45] Mar. 28, 1972

[54] PENDULOUS TYPE INERTIAL REFERENCE DEVICES

[72] Inventor: Donald J. Pliha, 225 South Hamel Drive, Beverly Hills, Calif. 90211

[22] Filed: Jan. 5, 1970

[21] Appl. No.: 675

[52] U.S. Cl. .......................................... 73/178 R, 33/220 B
[51] Int. Cl. ........................................... G01c 21/00
[58] Field of Search ........................... 73/178, 178 H, 178 T; 33/220 B, 226 Z

[56] References Cited

UNITED STATES PATENTS 3,537,307  11/1970  Pliha ................................... 73/178 R Primary Examiner—Donald O. Woodiel

[57] ABSTRACT

A non-gyroscopic inertial data reference device for aircraft capable of developing pitch angle, roll angle, lateral and longitudinal acceleration information and comprising a gravity-responsive pendulum device compensated for the effects of horizontal acceleration by the use of one or more accelerometers mounted on and free to move with the universally suspended pendulum, said accelerometers providing correction signals to suitable pendulum position torquers that assist in maintaining the pendulum in the true vertical position at all times.

5 Claims, 2 Drawing Figures

PENDULOUS TYPE INERTIAL REFERENCE DEVICES

This invention relates to acceleration compensated pendulous type inertial reference devices for aircraft, and more particularly to a unique, gravity-responsive acceleration-corrected pendulous platform which is intended for use in supplying aircraft attitude displacement and horizontal acceleration information to various instrument and flight control systems aboard the aircraft requiring such information.

While in flight, it is often desired to develop, without external reference, aircraft pitch angle, roll angle, fore and aft (longitudinal) acceleration, and sideward (lateral) acceleration. The longitudinal and lateral acceleration information may then be fed into a suitable navigation computer, not a part of this invention, to yield ground speed, track, and drift angle information. The sensing of aircraft attitude and horizontal acceleration is accomplished in accordance with this invention by an inertial data reference which obviates the need for complex, multi-gimbal gyro-stabilized platforms and which utilizes commercially available components of low cost and light weight. In a preferred embodiment, the invention comprises a pair of accelerometers, one of which has its sensitive axis in the plane of the aircraft longitudinal or roll axis and the other having its sensitive axis in a plane perpendicular to the aircraft longitudinal axis or parallel to the pitch axis, both accelerometers being stabilized in the local horizontal plane by a gravity-responsive pendulum.

The present invention is based generally on the principles disclosed in my copending application, Ser. No. 775,988, filed Oct. 10, 1968 now Pat. No. 3,537,307, but further including novel improvements therein which more fully adapt the invention for usage in precision control and instrumentation systems found aboard modern high-performance aircraft.

As noted previously, the present invention eliminates the gyroscopic elements normally associated with the leveling of conventional stabilized platforms and instead proposes the use of a gravity-responsive pendulum to maintain the accelerometers in the horizontal plane. A pendulum will maintain the true vertical with great accuracy when the aircraft is at rest or moving uniformly in a straight line, but is subject to temporary error during changes of speed or heading. Such errors arise from the fact that the pendulum is subject not only to the acceleration of gravity but to any other acceleration force acting thereon, such as horizontal acceleration forces due to turns and changes in speed of the aircraft.

In the present invention, an acceleration correction is introduced such that the true vertical reference will be maintained by the pendulum even during turns and marked changes of speed. More specifically, in the operation of the present invention the pendulum, upon changes in the horizontal acceleration of the aircraft, is restrained against reacting from acceleration forces developed by the aircraft, by applying to the pendulum forces which are proportional to the horizontal acceleration of the aircraft, these acceleration forces attempting to offset the pendulum from the true vertical position.

It is now apparent that the acceleration corrected pendulum of the present invention may serve as a highly accurate vertical reference to be used in the determination of aircraft pitch and roll attitude. Also, since the system accelerometers are mounted on and free to move with the pendulum about its universal mounting, they will have their acceleration-sensitive axes continually maintained in the horizontal plane thus providing accurate information regarding aircraft accelerations in the horizontal plane. These acceleration signal quantities are used to continuously correct the pendulum position for acceleration-induced error in addition to providing information to a separate navigation computer.

Pendulum devices of the prior art have utilized various combinations of dynamic brakes and motors to control the velocity of pendulum movements, in order to enhance operating stability. Unfortunately, although conventional damping means normally retard the velocity of the pendulum, the pendulum will still follow a harmonic motion generally with considerable velocity and certainly with a velocity which is greatest at the null or neutral point. This residual velocity of the pendulum at the null point carries it past center thus setting up an oscillating condition, making the device unsatisfactory for use in precision automatic flight control systems.

It is thus a principal object of this invention to provide a pendulum device designed for aircraft control and instrumentation purposes, which will have suitable damping provisions to prevent undesirable oscillations of the pendulum about the null or neutral point.

Another object of the invention is to provide a pendulous reference device suitable for automatic flight control purposes wherein undesirable harmonic motion will be substantially removed and the momentum of the pendulum will be controlled by retarding its velocity to a controlled value.

Still another object of the invention is to provide an improved, low cost, non-gyroscopic inertial data reference device for aircraft having a minimum number of parts and having high accuracy and reliability.

A further object of the invention is to develop information pertaining to the pitch and roll attitude of an aircraft by means of a relatively simple pendulum device corrected for acceleration effects.

A still further object of the invention is to develop information pertaining to the horizontal accelerations of the aircraft along two mutually perpendicular axes by use of accelerometers stabilized in the horizontal plane by the vertical-seeking property of a pendulum, and to use such information for both the acceleration correction of the pendulum and if desired, as a navigational data input to a separate inertial navigation computer.

Another object of the invention is to provide a pendulum type vertical reference device of the above character which is fully responsive to at least 360° rotation about two mutually perpendicular pivot axes.

Further objects, features, and advantages of this invention will become apparent from the following description and claims when read in view of the accompanying drawings, in which:

Figure 2:
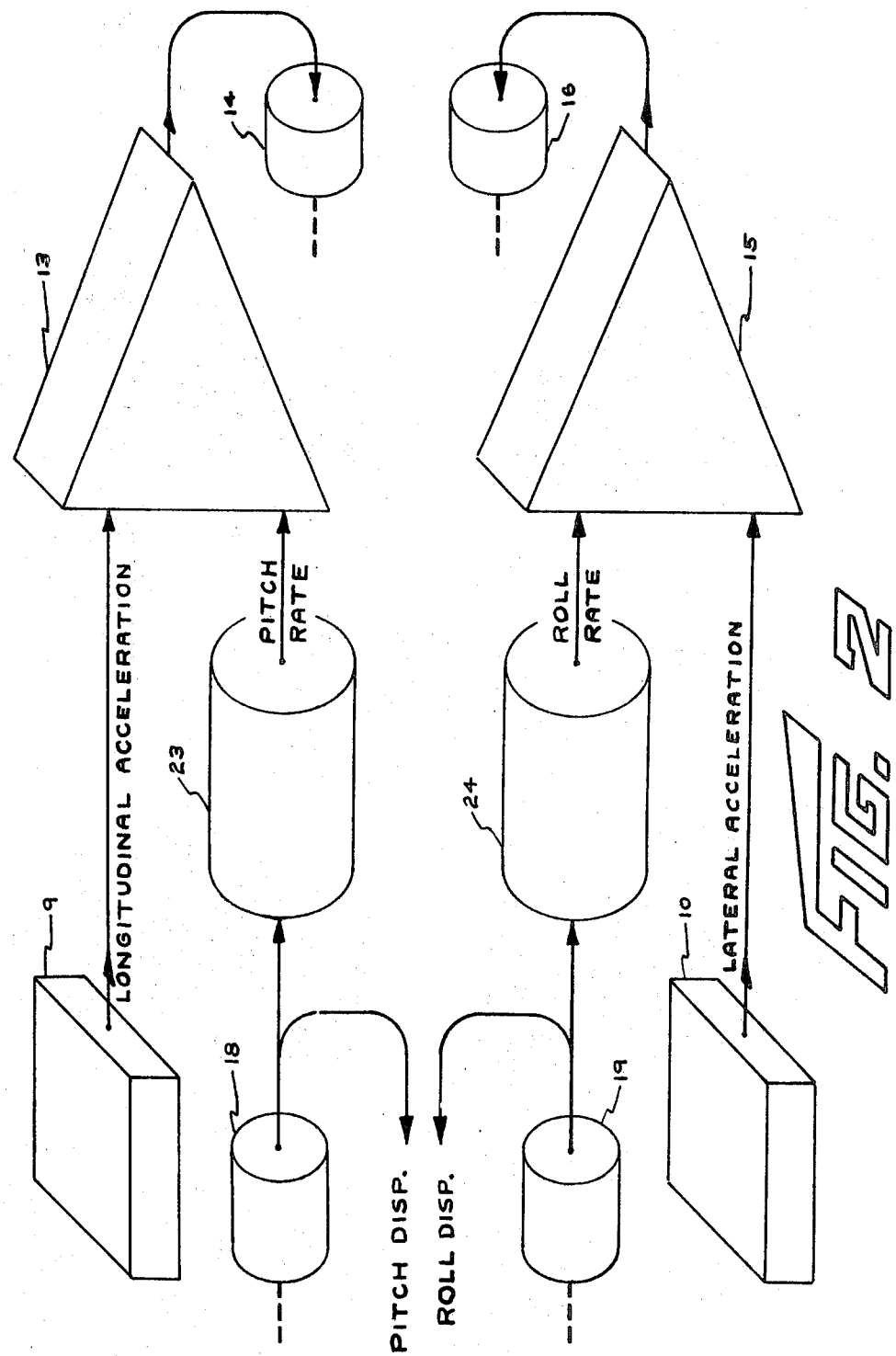
FIG. 2 is a diagrammatic representation of the pendulum acceleration correction and dynamic damping control system of the invention.

It should be noted that in FIG. 2, the electrical circuit connections have been schematically indicated as extending directly between the electrically inter-connected parts of the platform assembly. In practice, however, slip rings and brushes of conventional construction are provided at the bearing-trunnion connections between mechanically joined parts to facilitate the passage of electrical energy therethrough. Such details are not shown in the drawings in order to avoid unnecessary complication thereof.

Figure 1:
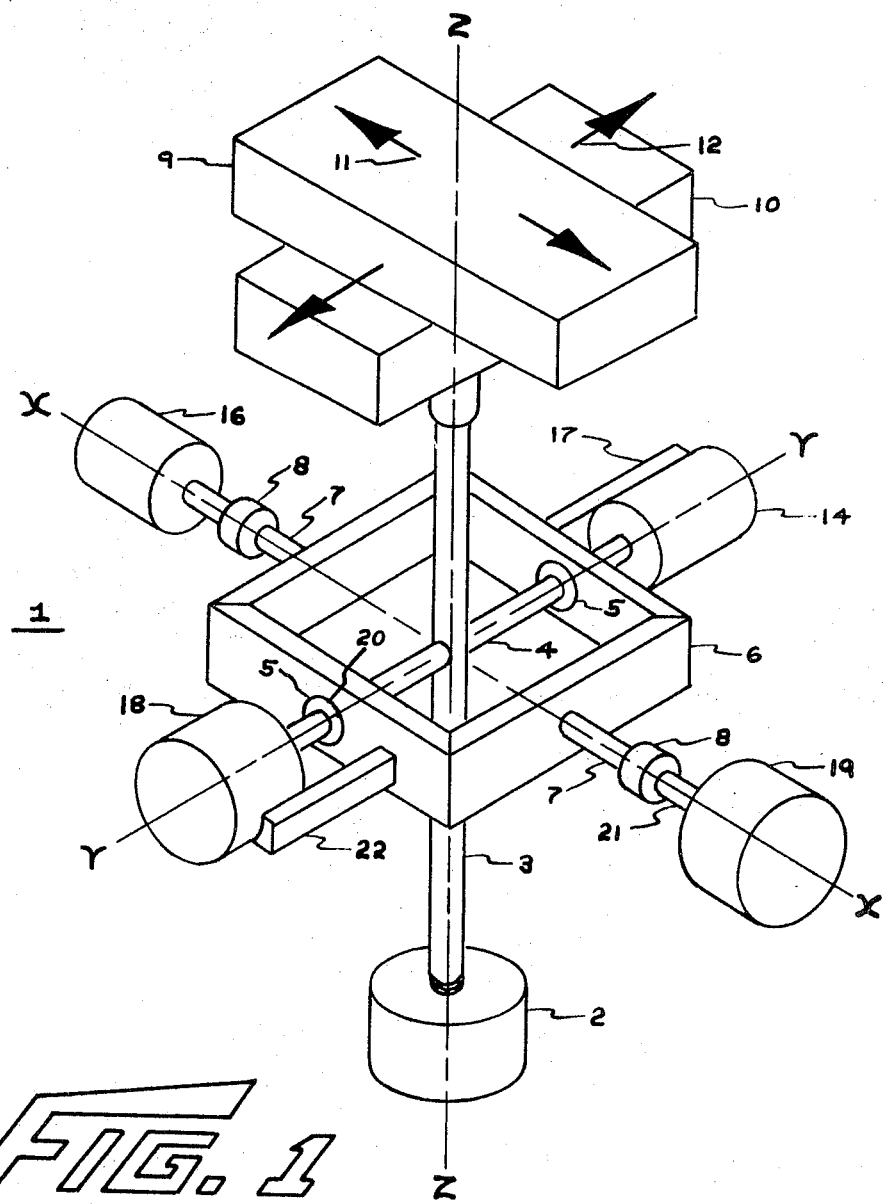
FIG. 1 illustrates in perspective view the basic elements of the inertial platform of the present invention.

Referring now to the drawings and particularly FIG. 1, in which the pendulous platform is indicated generally at 1, it is shown that the pendulous weight 2 is rigidly fixed to the pendulum shaft 3. Preferably, the weight 2 is threaded or otherwise adjustably mounted upon the shaft 3 so that the weight can be adjusted upwardly or downwardly of the shaft 3 along the axis Z—Z for dynamic balancing of the platform 1. The shaft 3 is rigidly attached to the pitch trunnion 4, which extends across the gimbal frame 6, being supported and journaled in suitable antifriction bearings 5, pressed into the frame 6. Note that the axis of rotation of the pitch trunnion 4 is parallel to the transverse axis Y—Y of the aircraft and is normal to the aircraft longitudinal axis X—X.

The frame 6 also incorporates trunnions 7 extending outwardly along a plane corresponding to the axis X—X of the aircraft to allow rotational freedom of the frame 6 and its attached elements about the roll axis X—X of the aircraft. The trunnions 7 are supported and journaled in suitable antifriction bearings 8, carried by a structural member of the aircraft, not shown. Note that the axis of rotation of the trunnions 7 is parallel to the longitudinal axis X—X of the aircraft and is normal to the transverse axis Y—Y of the aircraft.

In operation, when the aircraft remains in a level pitch attitude, the pendulous platform 1 points directly downwardly at the floor of the aircraft. If the aircraft "noses down," the platform 1 is displaced, relative to the aircraft structure, rotating the pitch trunnion 4 relative to the frame 6 and affording a direct indication that the pitch attitude of the aircraft has changed. On the other hand, if the nose of the aircraft is brought up, the platform rotates the trunnion 4 in the opposite direction.

Similarly, when the aircraft remains in a level roll attitude, the platform 1 again points straight downwardly. If the aircraft should now roll to the left, for example, the platform is once again displaced, rotating the frame 6 and trunnions 7, relative to the aircraft structure about the axis X—X, thus affording a direct indication that the roll attitude of the aircraft has changed. If the aircraft is caused to roll to the right, the platform will then rotate the frame 6 and trunnions 7 about the axis X—X in the opposite direction.

The simple pendulum system just described would be subject to error as a result of horizontal accelerations of the aircraft acting on the platform 1 and particularly on the weight 2. This error is corrected in accordance with the teachings of the present invention by means of the acceleration correction control system, which is activated in accordance with the output signals developed by the pendulously mounted accelerometers 9 and 10.

For the purpose of compensating or correcting the platform for the acceleration forces created by changes in aircraft speed along the axis X—X, the accelerations are sensed and measured along the sensitive axis 11 of the longitudinal accelerometer 9 in a plane parallel to the axis X—X. The accelerometer 9 is rigidly mounted on and free to move with the universally mounted platform 1. The accelerometer 9 is provided with a pickoff, not shown, for developing a signal voltage having an amplitude and phase corresponding to the instantaneous value and direction of acceleration along the sensitive axis 11.

Referring now in detail to FIG. 2, the signal voltage developed by the accelerometer 9 is fed to the input of a mixing or summing amplifier 13, which may be of magnetic amplifier design. The amplified output signal from the amplifier 13 is representative in proportion and sense of the signal from the pickoff of the accelerometer 9 and is utilized to energize the electromagnetic trunnion torquer 14. The torquer 14 functions to restrain the platform 1 about the axis Y—Y by means of the trunnion 4 to counterbalance the drag due to the inertia of the weight 2 whenever an acceleration occurs along the axis X—X. Thus the weight 2, instead of lagging relative to the aircraft as it accelerates, is accelerated at the same rate and as a result, the platform 1 is maintained in accordance with the true vertical about the axis Y—Y at all times.

Similarly, for the purpose of compensating the platform 1 for the acceleration forces created by changes in aircraft speed along the axis Y—Y, the accelerations are measured along the sensitive axis 12 of the lateral accelerometer 10 in a plane perpendicular to the axis X—X and parallel to the axis Y—Y. The universally mounted pendulum 1 provides a rigid mounting base for the accelerometer 10. The torquer 16 is energized through an amplifier system identical in design and operation to the longitudinal acceleration correction system described previously. In this case, however, the output voltage of the amplifier 15 is used to energize the torquer 16 to restrain the trunnion 7 and the frame 6, with its attached elements, about the axis X—X to counterbalance the drag due to the inertia of the weight 2.

With the arrangement just described, it is apparent that translatory accelerations acting upon the platform 1 from any angle about the axis Z—Z in the horizontal plane will be resolved into signal quantities representing rectangular acceleration components by means of the two mutually perpendicular sensitive axes 11 and 12 of the accelerometers 9 and 10, respectively. With proper calibration, accordingly, the pendulous platform 1 may be effectively corrected for changes in the horizontal acceleration of the aircraft.

It should be understood that if the accelerometers 9 and 10 were rigidly mounted, or "strapped-down," to the airframe structure and not pendulously mounted, the sensitive axes of the accelerometers would register not only horizontal accelerations but also accelerations due to changes in the attitude of the aircraft. This would not give the true horizontal acceleration of the aircraft which is the factor causing horizontal acceleration forces on the platform at right angles to the acceleration of gravity. Furthermore, the acceleration signals developed by such "strapped-down" accelerometers would be unsuitable for use with an inertial navigation computer without entailing substantial additional complication.

The electromechanical trunnion torquers 14 and 16 may comprise torque motors, rotary solenoids, or magnetic particle clutch units. The housing of the torquer 14 is fixed to and rotates with the frame 6, by means of the support 17, about the axis X—X. The roll torquer 16 has its housing fixed to the airframe structure, not shown. When deenergized, the torquers 14 and 16 offer no opposition to the rotation of their respective trunnions 4 and 7.

The signal voltages which represent angular displacement of the aircraft about its pitch and roll axes are developed by the pickoffs 18 and 19, respectively. The pickoffs 18 and 19 may take the form of rotary transformers or resistance potentiometers and are installed such that their rotor shafts 20 and 21 are mechanically coupled and responsive to the rotations of the trunnions 4 and 7, respectively. The housing of the pitch pickoff 18 is rigidly fixed by the support 22 to the frame 6 with the housing of the roll pickoff 19 being rigidly fixed to a structural member of the aircraft, not shown. It will be appreciated that the amplitude and phase of each of these signal voltages from the pickoffs 18 and 19 represents the extent and direction of angular displacement of the aircraft about the pitch and roll axes, respectively. These signals may be applied to any apparatus aboard the aircraft requiring attitude information, such as automatic flight control systems and flight director instrumentation systems.

In order to avoid short duration spurious angular movements of the trunnions 4 and 7, caused by turbulent flying conditions, aircraft maneuvering, or by harmonic motion of the pendulum, an electronically controlled error-rate pendulum motion damping system is provided as a part of this invention. The present damping system obviates all deficiencies of prior pendulum damping devices and in addition removes substantially all harmonic motion, governs the momentum of the pendulum by retarding its velocity to a controlled value, and provides dynamic braking through use of the torquers 14 and 16.

Aircraft pitch and roll displacement information, developed by pickoffs 18 and 19, is used not only as a data input to the various aircraft systems requiring such information, but is also used as a data input to the pendulum dynamic damping system circuits. In the following functional description, the elements and operating principles of only the pitch axis damping channel will be discussed for the sake of simplicity and clarity, the roll channel being of identical design and operation.

The pitch displacement signal developed by the pickoff 18 is fed into a derivative circuit 23 which differentiates this signal with respect to time. The derivative circuit 23 may be, by way of example, an electronic resistance-capacitance (R-C) network or other suitable electronic or electromechanical differentiating device possessing a negligible lagging effect, i.e.: quick response time. The signal obtained by differentiating the displacement signal is a transient or decaying signal which exists only as long as the signal output of the pickoff 18 is changing rapidly and disappears when this signal is either constant as in a steady climb or zero as in level flight. The output from the derivative circuit 23 is then applied to one input of the summing amplifier 13 along with the linear acceleration signal developed by the longitudinal accelerometer 9. Thus, the output of amplifier 13 is a composite signal comprised of the longitudinal acceleration correction signal plus the pitch rate signal. The combination of these signals may be effected in any suitable computer, such, for example, as a reset magnetic amplifier. A typical amplifier of this type is the Ferrac Magnetic Amplifier, manufactured by Airpax Electronics, Seminole Division, Fort Lauderdale, Florida. This type of amplifier includes a plurality of control inputs and a polar output.

It is well known that a freely swinging pendulum will follow a harmonic motion with considerable velocity, this velocity being greatest at the null or neutral point of the pendulum swing. It is the purpose of the derivative circuit 23 to minimize this oscillation about the null point by providing suitable pendulum damping signals to the pitch trunnion torquer 14 through the summing amplifier 13. The circuit 23 is insensitive to long term displacements of the pickoff 18 and will not offer any appreciable signal output during normal pitch attitude changes of the aircraft. However, whenever the pickoff output signal fluctuates abruptly, thus indicating harmonic motion, the rate of change of this signal is relatively high, and the output signal from the circuit 23 rises to a maximum. This differentiated signal is then amplified in the amplifier 13 and fed to the torquer 14. The torquer 14 then applies compensating forces to the platform 1, in alternating directions and amplitudes as needed, until the disturbance is completely dampened out.

Likewise, the roll displacement signal from the pickoff 19 is differentiated by the circuit 24, the resultant roll rate signal quantity being combined with the lateral acceleration signal in the summing amplifier 15 to develop sufficient power to energize the torquer 16.

It is now apparent that whenever short term angular oscillation of the pendulum occurs, it will be instantaneously dampened out through the action of the above-described system. Such oscillations may be set up through normal harmonic motion or through external disturbances to the pendulum. Regardless of the cause of the undesired motion, the rate of change of the displacement will be sensed and appropriate control forces will be applied to the pendulum to stabilize its movement.

The device illustrated in FIG. 1 possesses certain inherent mechanical limitations that will not permit the pendulum to respond to a full 360° of travel about the pitch axis of an aircraft. However, the illustrated embodiment may be made to respond to a full 360° of travel about the roll axis X—X. The angular limitations set forth by the illustrated embodiment adequately fulfill the requirements for attitude reference aboard the vast majority of aircraft. If however, a full 360° of angular travel is desired about both the pitch and roll axes, a modified type gimbal frame 6 may be provided. In this case the frame 6 is extended in length along the axis X—X in order to allow the pendulum assembly to rotate freely about the Y—Y axis in a full 360° arc. Additionally, continuous rotation of the pendulous platform 1 about the pitch or roll axes (induced, for example, by a full loop or rolling maneuver of an airplane) may be provided for by incorporating electrical slip ring and brush contacts between the stationary pendulum supports and the pendulum.

Pivoting of the pendulum shaft 3 at its longitudinal center facilitates compact packaging of the complete platform assembly with no compromise in operational or maintenance accessibility characteristics. Additionally, there is more than adequate room on the platform 1 for mounting not only the accelerometers 9 and 10, but also practically anything else that one wants to. For example, amplifiers and other electronic equipment may be mounted on the platform to reduce the number of electrical lead-in wires routed from the platform 1 to the stationary housing.

From the foregoing it has been seen that there is provided by the invention herein disclosed and described a freely mounted pendulum which is maintained at all times with its vertical axis in accordance with the true vertical. The pendulum is prevented from assuming the pseudo-vertical upon changes in the movement of the aircraft by mechanism which continuously generates forces acting on the pendulum which forces are applied to and prevent any lag of the pendulum and cause it to accurately partake of the changes in the motion of the aircraft. Furthermore, since the pendulum continuously remains at the true vertical position due to compensation for acceleration, no correction is necessary for the rotation of the earth or movement of the aircraft over the earth's surface other than that effected by the natural pull of gravity. Additionally, the provision of an electronically controlled pendulum error-rate type damping system ensures an optimum degree of operating stability along with acceptable sensitivity to aircraft attitude and acceleration changes.

It should be noted that although the illustrated embodiment of the present invention shows a pendulum platform comprising two mutually perpendicularly mounted accelerometers, this is not to be construed as the only configuration that the invention may take the form of. For instance, a single accelerometer may be used therewith, thus providing pendulum stabilization about but a single pivot axis. A simplified configuration such as this may be desirable for usage in certain aircraft control and instrumentation systems.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In an inertial reference device for aircraft, the combination comprising:
    an accelerometer responsive to the acceleration of the aircraft along a predetermined axis for producing a signal indicative of said acceleration,
    a pendulum support,
    a pendulum mounted in the support for movement about an axis perpendicular to the acceleration responsive axis of said accelerometer,
    means for mounting said accelerometer on said pendulum such that the acceleration-responsive axis of the accelerometer is maintained in the horizontal plane by the gravity-responsive pendulum,
    means for applying a variable torque about the pivot axis of said pendulum to compensate for the effect of horizontal acceleration forces on the pendulum said forces acting through a plane corresponding to the acceleration-responsive axis of the accelerometer,
    means for activating said torque applying means in accordance with aircraft acceleration along the acceleration-responsive axis of the accelerometer,
    means for producing a signal proportional to the angular displacement between the vertical axis of said pendulum and the horizontal plane of the aircraft,
    means adapted to receive and differentiate with respect to time output data from said angular measuring means to thereby generate corresponding data proportional to the rate of change of angular displacement of the aircraft, and means adapted to provide differentiated aircraft angular displacement information about the first and second pivoting axes to corresponding first and second torquing means arranged in such a manner so as to provide dynamic damping of spurious pendulum movements about two mutually 2. In an inertial reference device for aircraft, the combination comprising:
    a pendulum support,
    a pendulum mounted on the support for movement about mutually perpendicular first and second pivoting axes,
    first means for applying a variable torque about the first pivoting axes of said pendulum,
    second means for applying a variable torque about the second pivoting axes of said pendulum, first angular measuring means responsive to angular changes of the aircraft position in space about the first named pivoting axis of said pendulum, second angular measuring means responsive to angular changes of the aircraft position in space about the second named pivoting axis of said pendulum, means adapted to receive and differentiate with respect to time output data from said first and second angular measuring means to thereby generate corresponding data proportional to the rate of change of angular displacement of the aircraft about the first and second pivoting axes of said pendulum, and means adapted to provide differentiated aircraft angular displacement information about the first and second pivoting axes to corresponding first and second torquing means arranged in such a manner so as to provide dynamic damping of spurious pendulum movements about two mutually perpendicular axes.

3. In an inertial reference device for aircraft, the combination comprising:

a pendulum support, a pendulum mounted on the support for movement about mutually perpendicular first and second pivoting axes corresponding to the fore and aft and transverse axes of the aircraft, first means for applying a variable torque about the first pivoting axis of said pendulum, second means for applying a variable torque about the second pivoting axis of said pendulum, first means for producing a signal proportional to the angular displacement between the normal vertical axis of said pendulum and the aircraft fore and aft axis about the transverse axis of said aircraft, second means for producing a signal proportional to the angular displacement between the normal vertical axis of said pendulum and the aircraft transverse axis about the fore and aft axis of said aircraft, means adapted to receive and differentiate with respect to time output data from the first angular measuring means to thereby generate corresponding data proportional to the rate of change of angular displacement of the aircraft about the transverse axis, means adapted to receive and differentiate with respect to time output data from the second angular measuring means to thereby generate corresponding data proportional to the rate of change of angular displacement of the aircraft about the fore and aft axis, means adapted to provide differentiated aircraft angular displacement information about the transverse axis to the first torquing means, said torquing means arranged in such a manner so as to provide dynamic damping of spurious pendulum movements about the transverse axis, and means adapted to provide differentiated aircraft angular displacement information about the fore and aft axis to the second torquing means, said torquing means arranged in such a manner so as to provide dynamic damping of spurious pendulum movements about the fore and aft axis.

4. In an inertial reference device for aircraft, the combination comprising:

a pendulum support, a pendulum mounted on the support for movement about a pivot axis, means for applying a variable torque about the pivot axis of said pendulum, sensing means responsive to the rate of change of angular velocity of said pendulum about the pivot axis for producing a signal proportional in magnitude and sense to the angular acceleration of the pendulum about the aforementioned axis, and means provided to supply signal data developed by said sensing means to said torquing means to provide damping of spurious pendulum movements about the pivot axis.

5. An inertial reference device as claimed in claim 2 in which said pendulum is pivoted about mutually perpendicular axes at the dimensionally longitudinal center of the pendulum shaft.

* * * * *